(12) United States Patent
Jacobs

(10) Patent No.: US 11,684,199 B2
(45) Date of Patent: Jun. 27, 2023

(54) APPARATUS FOR BEVERAGE BREWING

(71) Applicant: Robert David Jacobs, Franklin, NY (US)

(72) Inventor: Robert David Jacobs, Franklin, NY (US)

(*) Notice: Subject to any disclaimer, the term of this patent is extended or adjusted under 35 U.S.C. 154(b) by 440 days.

(21) Appl. No.: 16/893,754

(22) Filed: Jun. 5, 2020

(65) Prior Publication Data

US 2020/0297153 A1   Sep. 24, 2020

Related U.S. Application Data

(63) Continuation-in-part of application No. 15/688,058, filed on Aug. 28, 2017, now Pat. No. 10,729,277.

(51) Int. Cl.
  *A47J 31/20* (2006.01)
  *A47J 31/52* (2006.01)
  *A47J 31/44* (2006.01)

(52) U.S. Cl.
  CPC ........... *A47J 31/20* (2013.01); *A47J 31/4407* (2013.01); *A47J 31/5253* (2018.08); *A47J 2202/00* (2013.01)

(58) Field of Classification Search
  CPC .................................................. A47J 2202/00
  See application file for complete search history.

(56) References Cited

U.S. PATENT DOCUMENTS

| | | | |
|---|---|---|---|
| 1,486,649 A * | 3/1924 | Ewert | A47J 31/20 99/319 |
| 1,602,632 A | 10/1926 | Zorn | |
| 2,304,004 A | 12/1942 | Low | |
| 2,311,759 A * | 2/1943 | Johnson | A47J 31/20 99/297 |
| 2,631,522 A | 3/1953 | Joy | |
| 2,858,762 A | 11/1958 | Ross | |
| 3,020,823 A | 2/1962 | Musso | |
| 3,023,691 A | 3/1962 | Turner | |
| 3,279,351 A | 10/1966 | Cohn | |
| 3,413,908 A * | 12/1968 | Nadelson | A47J 31/20 99/297 |
| 3,654,852 A | 4/1972 | Rosan, Sr. | |
| 4,401,014 A | 8/1983 | McGrail et al. | |

(Continued)

FOREIGN PATENT DOCUMENTS

| CN | 201847468 | * | 6/2011 |
|---|---|---|---|
| CN | 111195074 A | | 5/2020 |

(Continued)

OTHER PUBLICATIONS

Translation for CN201847468 published Jun. 2011.*
International search report for PCT/US20/62544 dated Feb. 26, 2021.
Related U.S. Appl. No. 15/806,692, Notice of Allowance and Fees Due dated Jun. 17, 2020, 12 pages.

(Continued)

*Primary Examiner* — Anthony J Weier
(74) *Attorney, Agent, or Firm* — Getz Balich LLC

(57) ABSTRACT

An apparatus for preparing a liquid includes a vessel including a top opening, the vessel able to hold a liquid; a shaft extending into the vessel; a basket coupled to the shaft, the basket having a cavity; and a motorized actuator assembly. The shaft is coupled to the motorized actuator assembly. The motorized actuator assembly vertically moves the shaft to move the basket. Moreover solid ingredients can be disposed in the basket to brew the beverage. The solid ingredient can include coffee.

20 Claims, 6 Drawing Sheets

(56) References Cited

U.S. PATENT DOCUMENTS

| | | | | |
|---|---|---|---|---|
| 4,709,625 | A | * | 12/1987 | Layre .................. A47J 31/18 99/289 R |
| 5,676,041 | A | | 10/1997 | Glucksman et al. |
| 5,957,035 | A | | 9/1999 | Richter |
| 6,085,638 | A | | 7/2000 | Mork et al. |
| 8,534,186 | B2 | | 9/2013 | Glucksman |
| 2002/0121197 | A1 | | 9/2002 | Mercier et al. |
| 2003/0202787 | A1 | | 10/2003 | Wu |
| 2007/0278202 | A1 | | 12/2007 | Long et al. |
| 2007/0295219 | A1 | * | 12/2007 | Van Hattem ........... A47J 31/18 99/289 R |
| 2010/0018403 | A1 | * | 1/2010 | Hoare .................. A47J 31/20 99/323 |
| 2013/0055901 | A1 | | 3/2013 | Zhang et al. |
| 2016/0270581 | A1 | | 9/2016 | Sealy |
| 2019/0059412 | A1 | | 2/2019 | Jacobs |
| 2019/0059634 | A1 | | 2/2019 | Jacobs |

FOREIGN PATENT DOCUMENTS

| | | |
|---|---|---|
| DE | 3530284 A1 | 3/1987 |
| DE | 4317902 A1 | 12/1994 |
| GB | 509740 A | 7/1939 |
| WO | 2008049163 A1 | 5/2008 |

OTHER PUBLICATIONS

Related U.S. Appl. No. 15/688,058 Non-Final Office Action dated Nov. 15, 2019, 17 pages.
Related U.S. Appl. No. 15/688,058 Final Office Action dated Apr. 6, 2020, 14 pages.
Related U.S. Appl. No. 15/688,058 Notice of Allowance and Fees Due dated Apr. 28, 2020, 8 pages.
Related U.S. Appl. No. 15/806,692, Non-Final Office Action dated Dec. 12, 2019, 17 pages.
Related U.S. Appl. No. 15/806,692, Final Office Action dated Apr. 7, 2020, 12 pages.

* cited by examiner

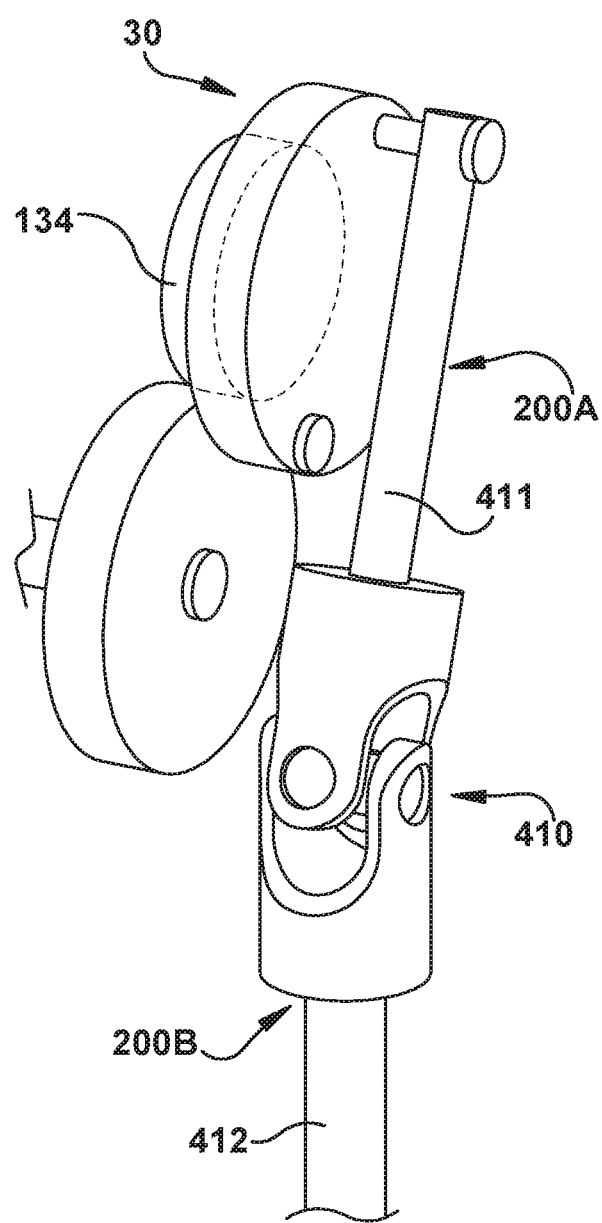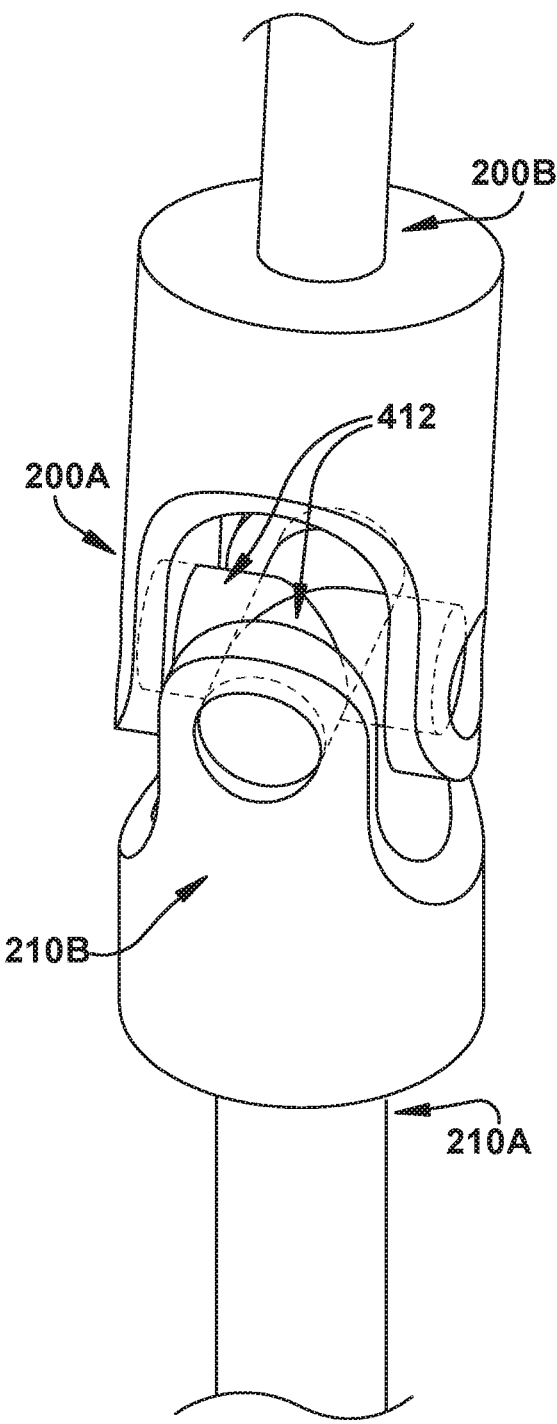
Fig. 4A
Fig. 4B

APPARATUS FOR BEVERAGE BREWING

This application is a Continuation-In-Part of U.S. application Ser. No. 15/688,058 filed Aug. 28, 2017, the disclosure of which is incorporated herein by reference in its entirety.

FIELD OF THE INVENTION

The device relates to brewing coffee and other beverages or liquids and, more specifically, to providing an apparatus and method for brewing coffee and other beverages that produce a high quality of coffee.

BACKGROUND OF THE INVENTION

Coffee is one of the most popular drinks in America. A 2015 Gallup poll found that nearly two-thirds (64%) of Americans drink at least one cup of coffee per day. See http://www.gallup.com/poll/184388/americans-coffee-consumption-steady-few-cut-back.aspx. Moreover, the same poll found that the average coffee drinker in America drinks nearly three full cups of coffee each day. Id Given coffee's wild popularity across the country, it is not surprising that coffee drinkers have more options for obtaining a cup of coffee than ever before. Today, coffee drinkers can purchase a cup of coffee at name-brand commercial coffee shops, like Starbucks and Dunkin Donuts; gas stations; street vendors; fast food locations, such as McDonald's (as well as at almost any food serving establishment); and numerous other locations (locations at which a coffee drinker may purchase coffee outside of their home are collectively referred to hereafter as "coffee shops"). Research suggests that coffee drinkers indeed swarm coffee shops. Trade magazines report that the average Starbucks serves over 500 customers each day and Dunkin Donuts reports that is sells nearly 2 billion cups of coffee in America each year. http://www.businessinsider.com/how-many-customers-starbucks-will-have-2013-10; https://news.dunkindonuts.com/news/brand-keys-names-dunkin-donuts.

Despite the ubiquity of coffee shops, the overwhelming majority of American coffee drinkers still make their coffee at home. See, e.g., https://www.aol.com/2011/01/25/savings-experiment-the-perks-of-brewing-versus-buying-coffee/. Making coffee at home offers numerous advantages. The most notable advantage is cost, as making coffee at home is less expensive than buying it at coffee shops. The average cost of a coffee shop coffee is between $2-$5. The average cup of coffee brewed at home, however, costs on average only 16 to 22 cents. For example, at $8 per pound (a common price for many types of coffee in typical US grocery stores), the average 10 cup per day user spends $0.20 per cup. Not surprisingly, numerous consumer publications that advise consumers to make coffee at home rather than pay comparatively high prices charged by coffee shops to save money.

However, there may be a drawback that at-home coffee drinkers may face is poor quality and taste, which can also be a problem at coffee shops. Many people believe that the beans that a person uses will dictate the quality and taste of coffee brewed at home. While bean quality is a factor that impacts taste, the factor that can overwhelmingly influence the quality and taste of coffee is the method of brewing.

SUMMARY OF THE INVENTION

An aspect of the embodiments provides an apparatus for preparing a liquid. The apparatus includes a vessel including a top opening, the vessel able to hold a liquid; a shaft extending into the vessel; a basket coupled to the shaft, the basket having a cavity; and a motorized actuator assembly. The shaft is coupled to the motorized actuator assembly. The motorized actuator assembly vertically moves the shaft to move the basket.

A further aspect of the embodiments provides for preparing a liquid. The apparatus includes a vessel including a top opening; a chamber, the chamber being liquid tight; a universal joint; a first shaft and a second shaft; a basket coupled to the second shaft; and a motorized actuator assembly, the motorized actuator assembly, the universal joint, the first shaft disposed entirely in the chamber. The first shaft is coupled to the motorized actuator assembly in the chamber and the first shaft is also coupled by the universal joint to the second shaft, the second shaft extending from the chamber out of the chamber and into the vessel. Thus, the universal joint allows the second shaft to vertically move the basket in the vessel.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 4A illustrates a perspective view of the motorized actuator assembly and universal joint, in accordance with aspects of the disclosure;

FIG. 4B illustrates an illustrative schematic configuration of a universal joint, in accordance with aspects of the disclosure;

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

The Science of Making Coffee

Figure 1:
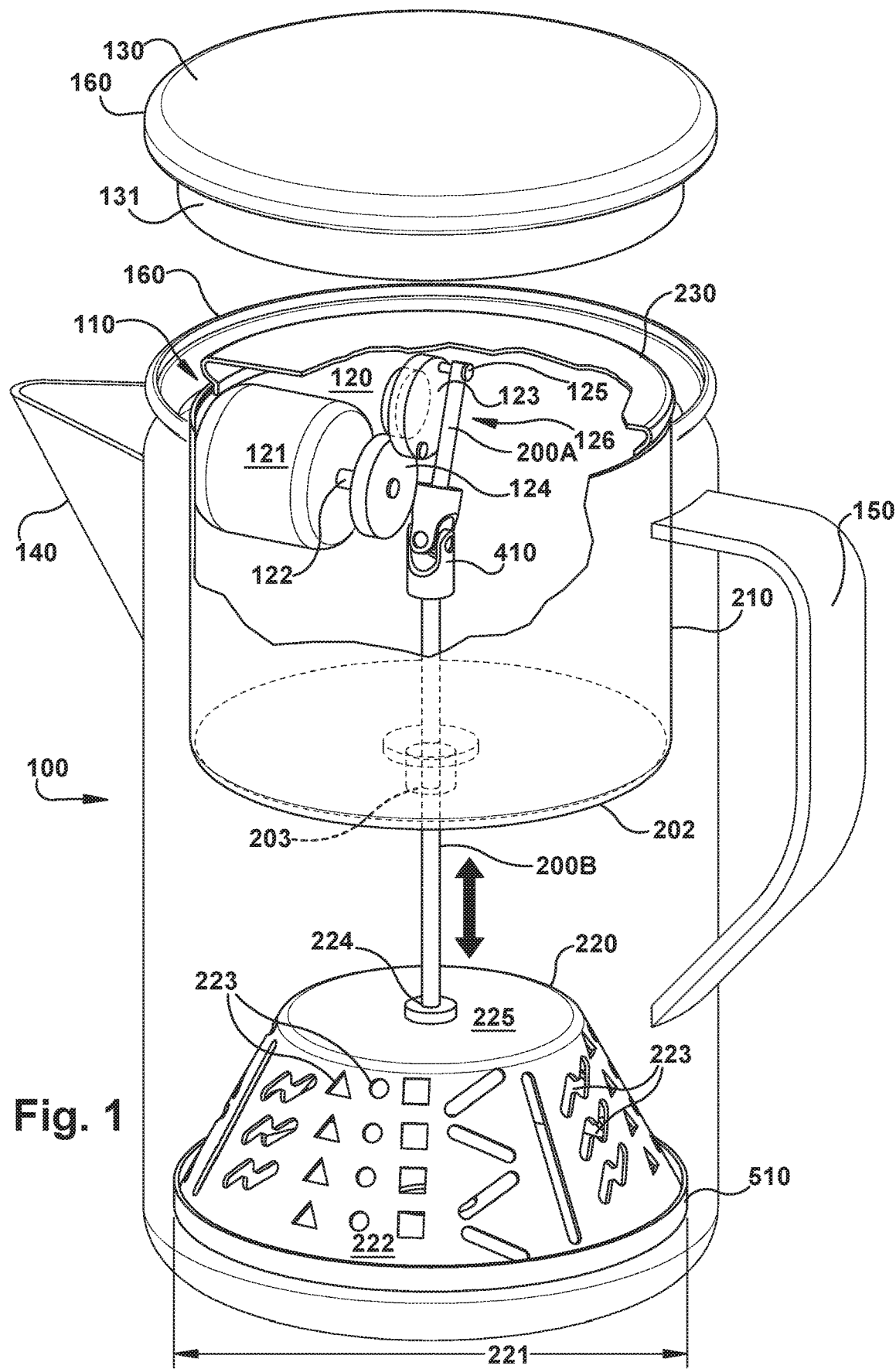
FIG. 1 illustrates a cross sectional perspective view of the apparatus, in accordance with aspects of the disclosure.

Humans have been brewing and drinking coffee for more than 500 years. Over that time, the science of making coffee has not changed significantly. When coffee is "brewed," technically what the user is doing is using hot water to extract natural oil from coffee beans. This coffee bean having the oil is infused with hot water to extract the oil, and a resultant oil-water mixture is "brewed coffee."

As explained below, the embodiments disclosed herein utilize a process known as "agitated infusion" (see U.S. patent application Ser. No. 15/688,058 to which this application claims priority). Agitated infusion is a process of immersing coffee grounds in water that is at or about tap temperature, gradually heating the water to approximately boiling, and agitating the grounds within the water while it is heated to approximately boiling. This gradual raising of the water temperature to near 212° F. (100° C.), combined with agitation of the grounds that are fully immersed in the gradually heating water (as explained herein), achieves a greater extraction of oil from the coffee grounds. With such extraction, two distinct benefits are achieved: (i) the brewed coffee is richer in flavor: and (ii) because the infusion process extracts significantly more oil from the coffee than other coffee brewing processes, the user is able to achieve a richer tasting brewed coffee using less coffee grounds, which is efficient and results in significant monetary savings. Any variation from the agitation infusion method, such as using water heated to a lower temperature or failing to utilize the gradual heating process and agitation (or any other variation), will result in the brewing process being unable to extract the very high percentage of oil from the grounds that can be extracted using agitated infusion. Also, failing to fully submerge the grounds in the water during the agitating and heating process, as provided during agitated infusion, may diminish the brewed coffee quality.

Turkish Coffee

Turkish coffee is among the oldest methods of brewing coffee and the process of making Turkish coffee is well known. For a good example of the prior art's discussion of Turkish coffee, see WO2007116350 A1 (Suleyman, et al). In short, to make Turkish coffee, the user places water into a carafe (or other receptacle) and places the carafe over heat (such as the flame of a stove or, in past times a fire). Then the user heats the water to a medium-high temperature. Once the water reaches that medium-high temperature, the user adds finely ground coffee to the carafe. The user then stirs the coffee within the carafe and allows the water with the coffee therein to continue to heat; this process extracts the oil from the coffee so that the oil begins to mix with the water, which forms brewed coffee. Once the coffee grounds begin to sink, the user stirs the coffee-water mixture again in a one dimensional direction. As the user stirs, the coffee-water mixture should begin to foam. Once the coffee-water mixture foams, the user stops stirring and removes the coffee-water mixture from heat. After a short time (for example, approximately 30 seconds), most coffee grounds will settle to the bottom of the carafe and the brewed coffee can be carefully poured into cups and served.

French Press

Among widely utilized coffee makers, French Press systems are generally considered to produce the best tasting coffee. In nearly every survey taken of coffee drinkers, the French Press is thought to be the best brewing method. Not surprisingly, many exclusive restaurants use only the French Press method.

A typical example of the French press process of brewing coffee is disclosed in U.S. Pat. No. 6,422,133 B1 to Brady. Like making Turkish coffee, a French press system works by immersing ground coffee directly into water—but the remainder of the process is different. In a French press system, the user pours coffee grounds into the empty French press carafe. Water heated to approximately 212° F. (100° C.) degrees is then added. The water will begin extracting oil from the coffee grounds to start forming brewed coffee. Some French press users will manually stir the grounds within the water in an effort to extract additional oil from the grounds, others do not stir. Whether the grounds are stirred or not, after the water is added the user must usually wait 3-6 minutes. During this time, the hot water will continue extracting oil from the coffee grounds, but the temperature of the water will decrease and the process of extracting oil will be weakened as the temperature falls. After these 3-6 minutes pass, the user slowly lowers the French press "plunger" from the top of the carafe to bottom. The head of the plunger is usually designed similar to a "screen," which permits the brewed coffee to pass through while trying forcing the now used coffee grounds to the bottom of the carafe. Once the brewed coffee is separated from the grounds, the user can pour the coffee out of the carafe.

Pour Over

The "pour over" method of brewing coffee is often also lauded as producing high quality coffee. Most often associated with the brand Chemex®, the pour over method involves the steps of heating water until the water is boiling, placing ground coffee within a filter and positioning the filter above a receptacle capable of storing brewed coffee, removing the boiling water from the heat source and pouring it over the coffee grounds so that the water flows through the grounds, filter, and into the receptacle. Most pour over users utilize a specific method of pouring the water over the coffee, which may include multiple pouring steps, in an effort to extract a maximum amount of oil from the grounds.

Drip Brewing Systems

There is no doubt that the most utilized coffee brewing system today is the "drip" coffee maker. Drip coffee makers have been a mainstay in the majority of American homes for decades. The standard drip system is described in U.S. Pat. No. 5,001,969 to Moore, et al. and brews coffee by spraying hot water over coffee grounds held in a filtered basket situated above a carafe. The sprayed hot water trickles through the grounds and extracts oil from the coffee grounds. There is an opening in the bottom of the filtered basket and when water mixed with coffee ground oil reaches the bottom, brewed coffee exits the opening and empties into the carafe. For standard drip systems, the carafe often rests atop a hot plate that keeps the brewed coffee warm.

Single-Cup Coffee Brewers

Single-cup coffee makers, such as the Keurig brewing system that is covered by numerous US patents, including U.S. Pat. Nos. 7,398,726; 7,165,488; 7,347,138; D513,572; 7,377,162; D544,299; 7,360,418; 7,513,192; 8,151,694, have over the last several years become extremely popular because of their convenience and speed. Rather than requiring the user to place coffee grounds in a basket or directly into water within a carafe, single-cup coffee makers use coffee "pods" (these coffee pods are commonly referred to as "K-cups®"). Coffee pods are a single-use, premeasured and prepackaged amount of coffee grounds that may be used to brew a single cup of coffee (as opposed to multiple cups of coffee, which can be brewed using the Turkish, French press, and drip systems discussed above). Single-cup coffee makers heat water to approximately 190° F. (approx. 88° C.) degrees before it contacts grounds in the pod. To initiate the brewing process, a user opens the system's coffee pod chamber and places a pod into the chamber. Next, the user closes the chamber. The chamber's structure will then pierce an upper portion of the coffee pod and pierce a lower portion of the coffee pod from below.

Once the chamber is closed, the user can begin the coffee brewing process, which is usually done simply by pressing a "start" button. This causes the system to pump heated water into the chamber. After the water enters the chamber, it enters the coffee pod via an upper pod portion opening created when the chamber closed. Once the water enters the pod, it contacts coffee grounds contained therein and mixes with oil from the grounds to brew coffee. The force of water pumped into the chamber, as well as gravity, force brewed coffee to flow out of the bottom pod opening, and brewed coffee then flows out of the machine.

Percolators

The modern iteration of a percolator coffee maker was patented in 1889 by an Illinois farmer named Hanson Goodrich, see U.S. Pat. No. 408,707 (other iterations of percolators are thought to have been utilized as long ago as 1810). In modern percolators (hereafter "percolators"), which have changed little if at all since Goodrich, the entire brewing process occurs within a carafe; the design and process is as follows:

The carafe should be fabricated using material that can withstand and transfer high levels of heat; metal is generally preferred. The carafe has a removable lid toward the top of the inside of the carafe. At the top of the carafe, there is a chamber (often made from metal mesh). The chamber has at least a porous bottom and can be donut-shaped, with an opening in the middle. Tubing (like a pipe) extends from the opening in the middle of the chamber, and extends downward toward the bottom of the carafe. The tubing does not reach or contact the bottom of the carafe. A user pours a desired amount of water into the carafe; the user places a desired amount of coffee grounds in the chamber (there are commercially available "packets" of coffee grounds for use in percolators; the packets are typically made of the same material as coffee filters, contain a premeasured amount of coffee grounds, and are often donut-shaped, like the chamber). The user then places the carafe over a heat source and the user adjusts the heat so that the water within the carafe rises to boiling or approximately boiling. As the temperature of the water approaches boiling, the water travels up the tubing from the bottom of the carafe to the region of the carafe above the chamber that holds the coffee grounds. When the water reaches the region above the chamber, it falls downward due to gravity atop the coffee grounds or the packet of coffee grounds that is held in the chamber. The falling water then trickles through the grounds, mixing with and extracting oil therefrom; and when the water reaches the bottom of the chamber, it falls through the chamber's mesh (or its porous bottom), and mixes with the rest of the water in the carafe.

As long as the heat remains sufficiently high, the water in the percolator can constantly cycle from the bottom of the chamber, up tubing, and downward through the grounds. The more cycles that the user allows, the more robust the coffee will be. When the user has permitted the percolator to cycle for a desired amount of time, the user removes the carafe from the heat source. A short period of time after the user has removed the carafe from the heat source, the percolator will stop cycling. The user can then pour the coffee.

Shortcomings of Currently Available Coffee Brewing Systems

Unfortunately for consumers, coffee brewing systems currently available may contain what some view as shortcomings that impair the quality of the coffee they produce. Alternately, people may consider systems inconvenient for consumers and relatively expensive. A non-exhaustive discussion of possible shortcomings of each system, many of which the present apparatus seeks to remedy, are below.

Turkish Coffee Shortcomings

For most consumers today, the most significant problem of making Turkish coffee is the inconvenience of the brewing process. It is no coincidence that single-cup brewers have exploded in popularity; in today's on-the-go world, putting a pod into the chamber and pressing start is the easiest way to make coffee. In contrast, Turkish coffee requires multiple steps that are laborious. The user must heat water and then deposit coffee grounds therein. Then the user must continue heating. Unlike drip and single-cup systems, where once the brewing process begins the user can simply wait for the coffee to be ready drink, brewing Turkish coffee generally requires the user to watch over the process from start to finish. Many users do not have the time to devote such vigilance in making coffee.

Aside from inconvenience, Turkish coffee also inheres several systemic problems for consumers. For example, if the consumer is not vigilant in the water heating process the grounds can remain in boiling water for too long of a time resulting denatured coffee, which can be very bitter. Another potential problem is that consumers will pour the brewed coffee from the carafe before the coffee grounds have fully settled, which results in consumers drinking coffee grounds. Still another problem may lie in clean up. Once the brewing process is complete, the user is left with a carafe full of wet, used coffee grounds that must be discarded and the carafe must be cleaned before it may be used to make more coffee.

As far as taste, the principal problem with Turkish coffee is that the water used to extra oil from the grounds is generally heated to a medium-hot temperature before the grounds are added or the water is heated for too long. An important aspect of the agitated infusion process is the gradual raising of water temperature while coffee grounds are immersed therein. By beginning the brewing process with water heated to a medium temperature (as opposed to the near boiling temperature water that many of the other brewing processes discussed herein utilize), Turkish coffee does, more than any other method of brewing coffee available to consumers to date, utilize the infusion process.

French Press Shortcomings

French Press systems suffer from the same convenience problems that plague Turkish coffee: the user must manually heat water, add grounds, and remain vigilant until the process is complete, and cleanup is inconvenient. In addition, most French press carafes are much smaller than drip system carafes. Because the size of the carafe is smaller, and the work and time involved to brew French Press coffee for several cups may generally be undesirable.

French Press systems also fail to take advantage of the infusion process. As noted above, when a user pours preheated water into the French Press carafe, the water is already heated to approximately 200°+F (100° C.). Although infusing the grounds in water heated to 200°+F (100° C.) will extract more oil than lower temperature coffee brewing methods (such as drip systems and single-cup systems, see infra), not using an infusion process may mean French Press systems will not extract the maximum amount of oil from the grounds, which means the brewed coffee may not be as robust as possible. In addition, the water used to brew coffee using a French Press begins to immediately cool once it is removed from the heat source, which can further reduce the ability of French Press systems to extract oil from the coffee.

Pour Over Shortcomings

The pour over method suffers shortcomings inherent to both the Turkish method and French Press systems. The user has to separately heating water before coffee can be made. Second, the heated water begins to cool as soon as it is removed from the heat, reducing the pour over method's ability to extract oil. In addition (and again like French Press), many pour over carafes hold a smaller volume of coffee and lack a heating.

The pour over method also lacks agitation. The coffee grounds merely sit stationary in the filter while water is poured over them. Moreover, altering the pouring method does not result in true agitation.

Drip System Shortcomings

Most drip systems inheres a host of shortcomings. First, the water temperature of most standard drip coffee makers is generally heated no higher than about 170° F. (77° C.) before it is sprayed over the coffee grounds. This poses two concerns. First, by merely preheating water as above and spraying it over grounds, drip systems do not employ an infusion process. Second, the water that is heated is not hot enough to extract high amounts of oil from the coffee. To extract the maximum amount of oil, the water temperature should reach approximately boiling. Further, the water begins to cool quickly after being sprayed on to the grounds, which further impairs the ability of most drip systems to extract oil.

The second concern with most drip coffee makers is the process by which they extract oil. Most drip systems simply spray hot water on to grounds, which is referred to as "washing" the grounds, and thus the water sometimes only contacts grounds directly below or very close to the spray nozzle. As a result, there are instances with only a fraction of the grounds are fully washed, and oil is extracted only from that fraction and the brewed coffee may only be a fraction as flavorful. The inability of most drip systems to extract oil from all of the coffee grounds translates to consumers wasting money on coffee that is not really used to brew coffee.

Some drip systems may incorporate a process by which centrifugal force circulates water through the grounds. While this may be an improvement over the spraying and washing method, it may be still less effective at extracting oil than the agitation and infusion methodology. In addition, centrifugal processes do not employ the gradual heating process; the water in those systems is heated prior to circulating through the grounds. See, e.g., U.S. Pat. No. 6,532,862 to Mork.

Single-Cup System Shortcomings

As noted above, single-cup brewing systems inundate the grounds in the pods with water that is preheated to 192° F. (89° C.). While water heated to this temperature may extract more oil from the grounds than water heated to lower temperatures, it is still below an approximate boiling temperature. Also, single-cup brewing systems fail to utilize gradual heating in the infusion process. Of course, Single-cup systems only brew a single cup of coffee at a time. While often convenient, reliance solely on a single-cup system does not expedite coffee for many. Finally, single-cup systems may be considered environmentally bad because of used plastic pods.

Percolator Shortcomings

Like the French Press and pour over, percolator systems require significant time, effort, and vigilance. The heat to cause water to rise through the tubing must be monitored, as must the length of time to cycle, because water reaching too high a temperature or heating for too long may result in coffee oils breaking down. In addition, coffee grounds may fall through the openings in the chamber which is undesirable. Additionally, percolators typically fail to have agitated infusion. Like a drip system, water merely trickles down through and washes the grounds; the grounds merely sit in the chamber while being washed.

As an initial matter, in order to clearly describe the current technology it will become necessary to select certain terminology when referring to and describing relevant components within the coffee or beverage brewing industry. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows.

It is often required to describe parts that are disposed at differing radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Where an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g. "between" versus "directly between," "adjacent" versus "directly adjacent," etc.). As used herein, the term "and/or" includes any and all combinations of one or more of the associated listed items.

The present apparatus provides an apparatus and method for brewing coffee and other beverages, such as tea, that employs an infusion process and liquid agitation, which extracts enhanced amounts of oil from coffee beans, coffee grounds, filter packs of coffee, tea, and the like to produce a brewed coffee of the highest quality and taste. The apparatus includes a vessel that holds liquid, such as but not limited to water. A basket is positioned within the vessel to hold filter packs of coffee, coffee beans, coffee grounds, tea, and the like (hereinafter "coffee" for ease of description) during the brewing process. A shaft extends down through the basket attached on one end to a motorized actuator assembly or a rotating device and the other end to the basket. The basket agitates the liquid while the brewing process occurs.

Once the user adds liquid and places the coffee grounds into the apparatus' basket, the user may use the apparatus to perform the method of brewing coffee disclosed herein, which is an automated process. The process is automated meaning that by starting a brewing cycle, the apparatus will begin agitating the liquid in the vessel and using a heating element to heat the liquid in the vessel from tap temperature to approximately boiling. The heating-agitation process lasts approximately 8 minutes. Once heating-agitation process is complete, the user may then enjoy the brewed coffee. This process takes all of the best elements from Turkish and French Press, and is significantly more efficient in extracting oil from coffee than any known, to the inventor, method or system of brewing coffee that is currently available. As a result of this increased efficiency, less coffee is generally required to brew coffee and users can expect monitorial savings.

Figure 2:
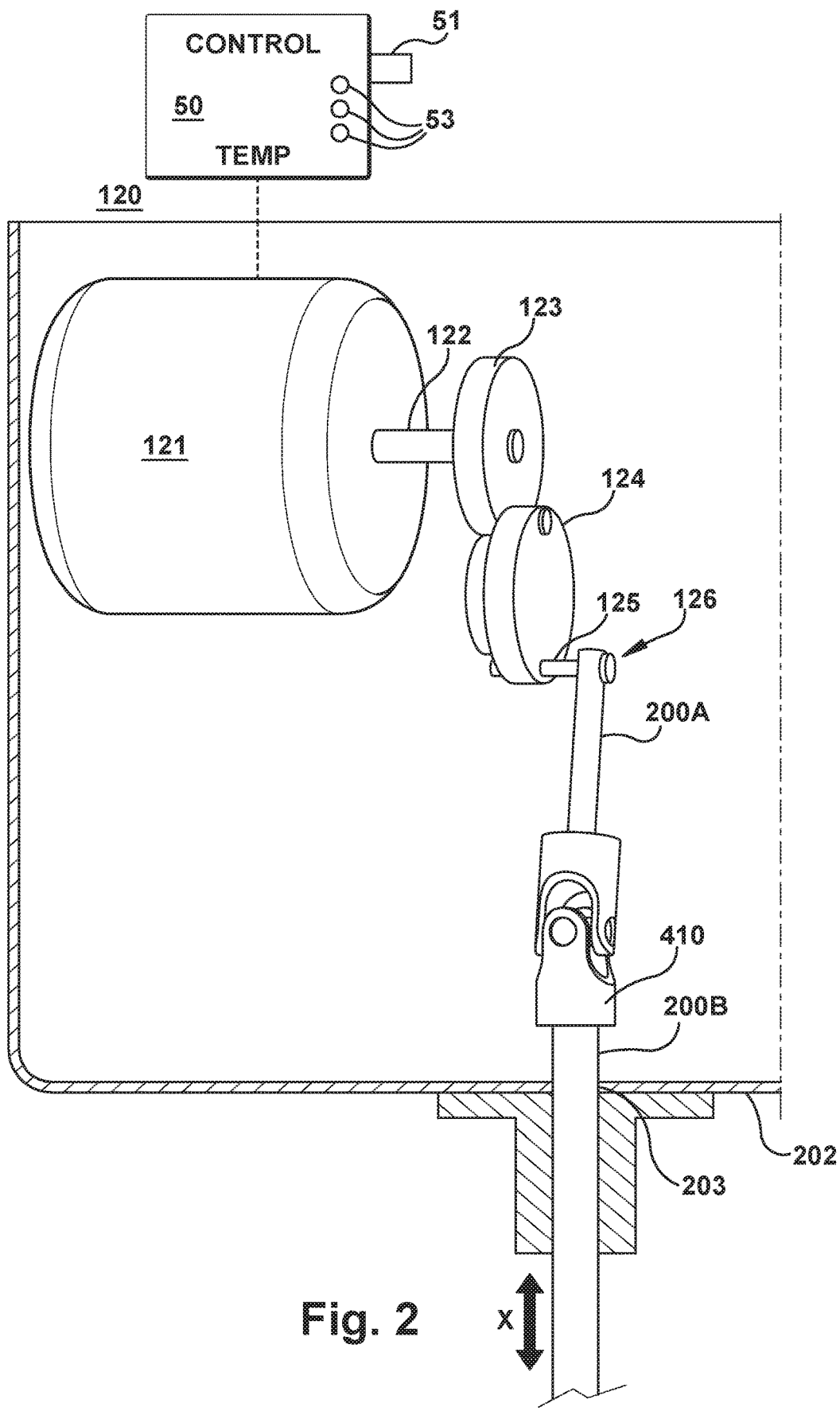
FIG. 2 illustrate an internal view of the chamber and motorized actuator assembly of the apparatus, in accordance with aspects of the disclosure.
Figure 3:
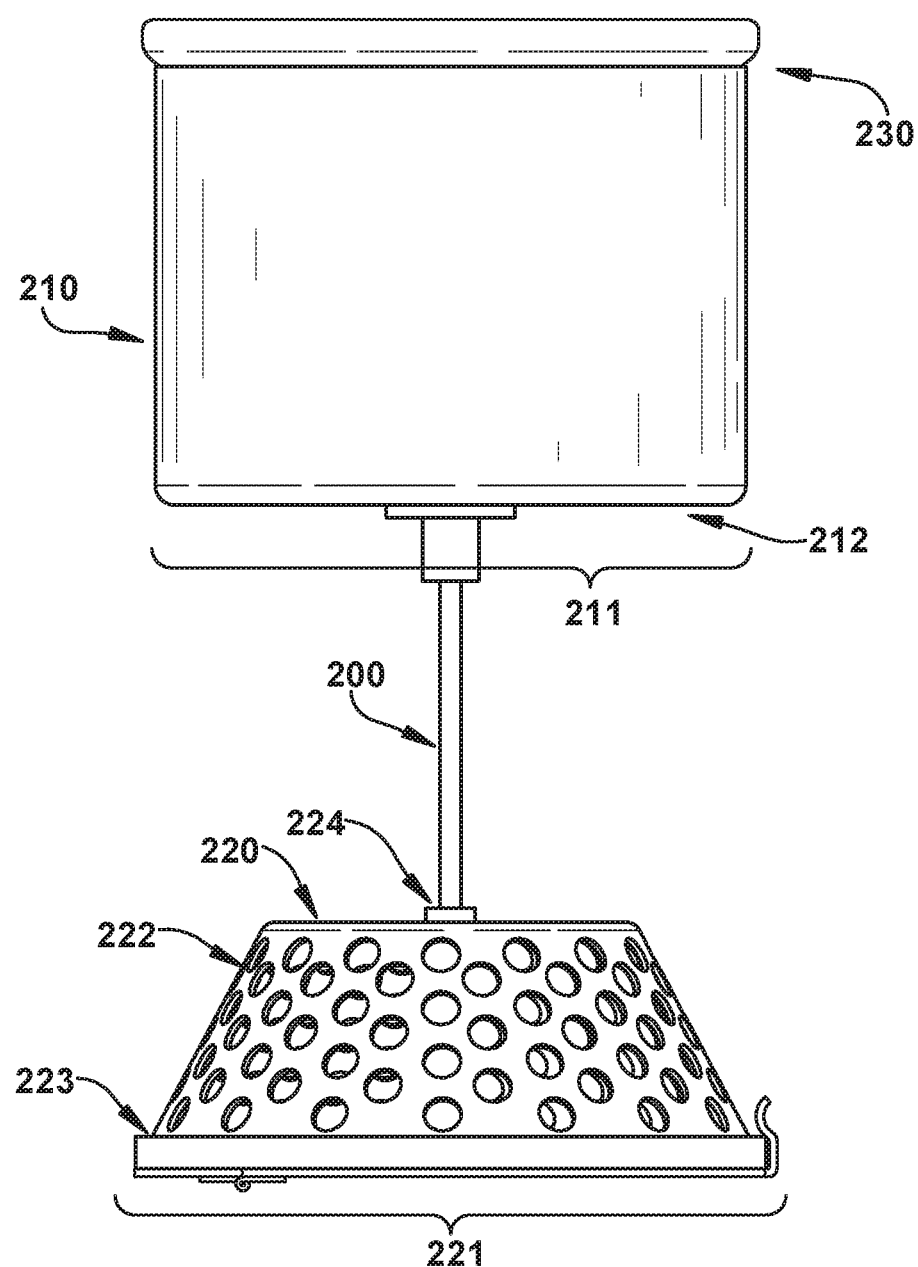
FIG. 3 illustrates a perspective view of the chamber, shaft and basket, in accordance with aspects of the disclosure.
Figure 5:
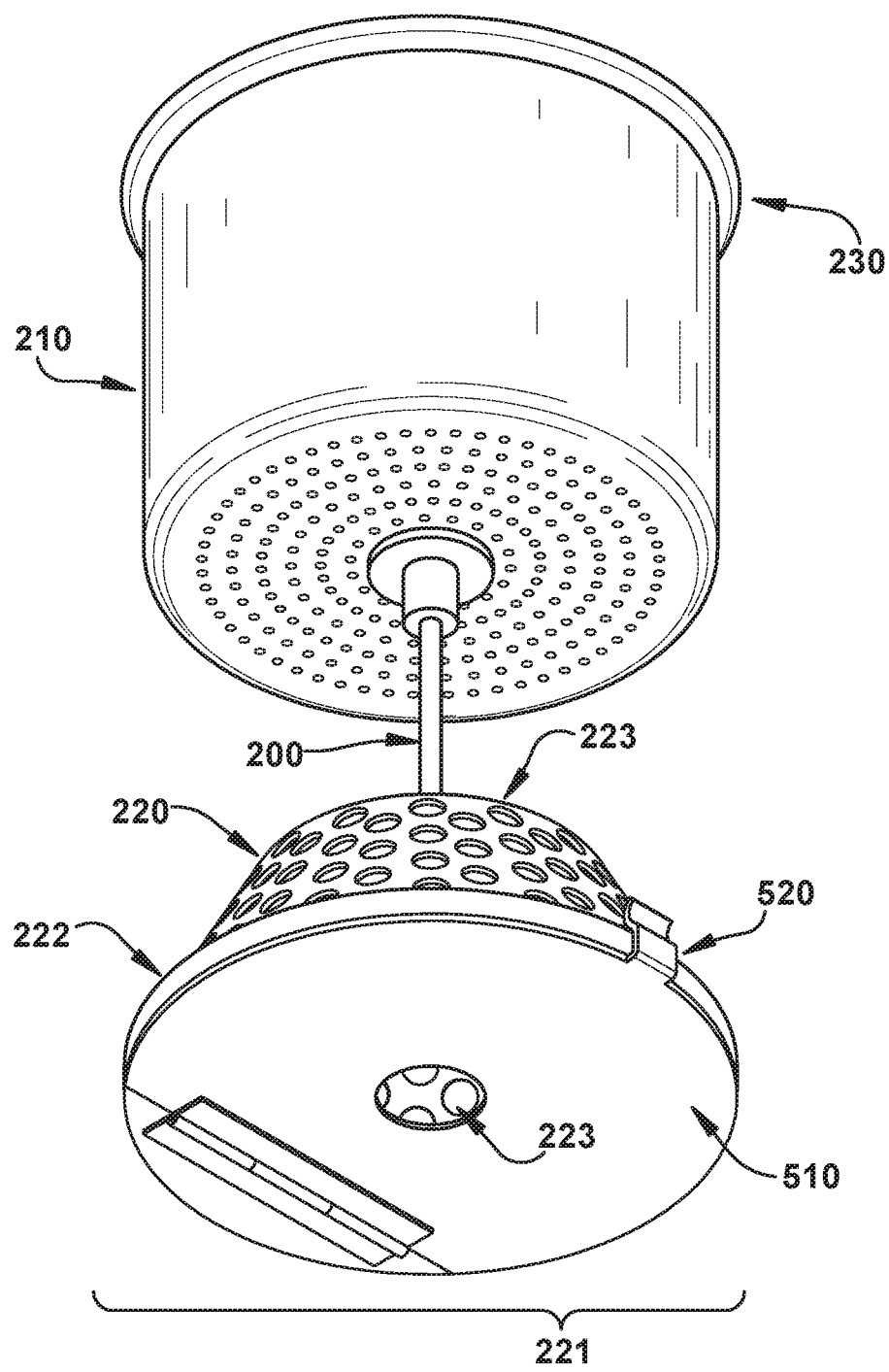
FIG. 5 illustrates a perspective view of the basket, shaft, and chamber, in accordance with aspects of the disclosure.

With reference to FIGS. 1 and 2, that illustrate a cross sectional overviews of the apparatus. The apparatus includes a vessel 100 that is able to hold a liquid and can withstand heat. For example, and in no way intended to limit the embodiments, vessel 100 can be formed of a metal, such as, but not limited to, stainless steel, however other metals, ceramics, and/or other materials that can withstand being heated are within the scope of the embodiments. The vessel 100 includes a top opening 110. A shaft 200 extends into the vessel 100 through a chamber 210. Chamber 210 houses motorized actuator assembly 120, and motorized actuator assembly 120 is coupled to one end of shaft 200, shaft 200A. A basket 220 is fixedly coupled to the other opposed end of shaft 200, shaft 200B.

Vessel 100 may also include a spout 140 that enables pouring liquid from vessel 100. Spout 140 is fixed near top opening 110. Vessel 100 may be provided with a handle 150, where handle 150 may also be fixed to vessel 100 near top opening 110. Handle 150 is often on an opposite side of vessel 100 approximately 180° spaced from spout 140. Handle 150 may be of any shape permitting vessel 100 to be maneuvered by handle 150 by a user.

Basket 220, as illustrated in FIG. 1, FIG. 3, FIG. 5, and FIG. 6, has a diameter 221 to fit within vessel 100. Basket 220 also includes a cavity 222 including openings 223. Access to cavity 222 of basket 220 is provided by a cover 510 disposed on a portion of basket 220. In the illustrated embodiments, cover 510 is provided on a bottom portion of basket 220. As discussed herein, cover 510 also includes openings 223 for ingress and egress of liquid from vessel 100 into basket 220. Vessel 100 is able to hold liquids and solid ingredients (as described herein solids or "ingredients") can be disposed in basket 220. Thus, when the apparatus 100 reciprocates basket 220, solid ingredients in cavity 222 can be contacted by liquid as liquid enters and exits basket 220 through openings 223.

Chamber 210 is positioned at top opening 110 when in the vessel 100 and may be made of any temperature resistant material. Chamber 210 includes a bottom rim that frictionally and tightly fits into top opening 110 of vessel 100. Chamber 210 also includes an upper side 160 that closes vessel 100. Chamber 210 may be provided with a similar circumferential perimeter and diameter as vessel 100, with a lower perimeter and diameter 211 less than a diameter of vessel 100, thus chamber 210 may be able to fit within vessel 100. Diameter 211 enables chamber 210 to fit through top opening 110 into vessel 100.

Chamber 210 is liquid tight and is sealed, even though in use chamber 210 stays above liquid in vessel 100. Chamber 210 encloses motorized actuator assembly 120. Motorized actuator assembly 120 is coupled to shaft 200, 200A, as illustrated by FIG. 1 and FIG. 2. Motorized actuator assembly 120 may be any device with a rotating structure for moving shaft 200, as is described herein. Motorized actuator assembly 120 may be coated or covered by a temperature and liquid resistance material. This coating prevents motorized actuator assembly 120 from damage due to increased temperatures or liquid.

Motorized actuator assembly 120 moves and controls shaft 200, 200A. Motorized actuator assembly 120 includes at least one of an alternating-current (AC) electric power supply or a battery drive (in some instances a rechargeable battery drive) or driven motor 121. Battery driven motor 121 in some instances may include a rechargeable battery drive. Battery driven motor 121 includes a rotor 122 that is rotated by battery driven motor 121. A rechargeable battery charge port can be positioned on any side of chamber 210, for example and in no manner intended to limit the instant embodiments, the charge port may be on the side of chamber 210 or on the top of chamber 210. Alternately, and in some embodiments, motorized actuator assembly 120 can be powered by a motor connected to an external power supply. That external power supply can include, but is not limited to, an AC cord, or any other external power supply now known or hereinafter developed.

Rotor 122 is connected to a first cam or gear 123. First cam or gear 123 is connected to an offset cam or gear 124 at connection point 127. Offset cam or gear 124 includes a pin or rod 125 is attached to shaft 200, 200A by a coupling 126. Coupling 126 may include, but is not limited to a slot and pin connection, pins, fixed attachments, screw connections, or any suitable coupling now known or hereinafter developed. In aspects of the embodiments, first cam or gear 123 and offset cam or gear 124 can be formed as one unitary and integral component. In other aspects of the embodiments, first cam or gear 123 and offset cam or gear 124 can be separate but connected elements. As illustrated, first cam or gear 123 and offset cam or gear 124 can be separate but connected by connection point 127.

In aspects of embodiments, motorized actuator assembly 120 moves the coupling coupled to shaft 200, 200A in a generally oscillating vertically linear (arrow X) motion, but the motion may include some non-vertically linear motion by virtue of the connection at coupling 126. The rotation of first cam or gear 123 and offset cam or gear 124 inherently provided vertical motion to shaft 200, 200A, but as understood from standard mechanics, the rotation of first cam or gear 123 and offset cam or gear 124 can impart some non-vertical non-linear motion to shaft 200, 200A.

Motorized actuator assembly 120 is electronically driven by a control 50. Control 50 includes an automatic temperature sensing and control module. Control 50 includes an "on" or "start" switch 51. Once the motorized actuator assembly 120 is started by a user actuating an "on" or "start" switch 51 of control 50, the motorized actuator assembly 120 will operate to transfer rotation of rotor 122 to generally vertical motion but not entirely linear motion to shaft 200, 200A as described herein.

Automatic temperature sensing and control module of control 50 of the motorized actuator assembly 120 will sense the temperature of liquid in vessel 100 until a designated temperature to start and to halt operation and movement of basket 220 (as described here) is reached. Control 50 includes at least one indicator, and the at least one indicator can include at least one temperature indicator that can indicate various temperature levels of liquid in vessel 100. Each at least one indicator 53 may provide a user with an indication that a temperature for starting motorized actuator assembly 120 has been reached. Another indicator of the at least one indicator 53 may provide the user with an indication that a designated "highest" temperature for making coffee for example, a temperature below boiling, for example in a range from 180° F. to 210° F., and more preferably from 190° F. to temperatures below 210° F. has been reached. Further, a single indicator of the at least one indicator 53 may provide all indications by various modes of signals. As embodied by the disclosure, various modes of signals may include but are not limited to flashing, colors, audio signals and/or customized signals as programmed by a user, or any signal type now known or hereinafter developed. Control 50 can be provided with a function that automatically turns off operation of motorized actuator assembly 120, if desired. Alternatively and in addition, at least one indicator 53 may provide an alert to user to turn off motorized actuator assembly 120 and/or remove vessel 100 from heat.

FIG. 4A and FIG. 4B illustrate universal joint 410 that connects portions 200, 200A and 200, 200B of shaft 200 within chamber 210. Universal joint 410 includes a coupling connector, which connects rigid rods 412. The coupling connector may include a pair of hinges oriented together freely connected by a crossing of rigid rods 412. Shaft 200 includes a first shaft 200, 200A and a second shaft 200, 200B. Universal joint 410 couples first shaft 200, 200A to second shaft 200, 200B via the rigid rods 411, 412 that allows relative movement in two axes. Universal joint 410 allows first shaft 200, 200A and second shaft 200, 200B to move independent of one another. In universal joint 410, a single rotational degree of freedom is constrained (the shaft rotation) as well as all relative translations, giving a universal joint two degrees of freedom.

In the embodiment seen in FIG. 4A, first shaft 200, 200A is smaller in length than second shaft 200, 200B. First shaft 200, 200A is coupled to motorized actuator assembly 120 by pin 125. Shaft 200, 200B extends from universal joint 410 through bottom surface 202 of chamber 210 through an aperture or hole 203 in bottom surface 202. Shaft 200, 200B extends from universal joint 410 through bottom surface 202 of chamber 210 through an aperture or hole 203 and moves in a substantially vertical movement in vessel 100. In terms of this description, the term "substantially vertical movement" means that the movement of shaft 200, 200B from the universal joint 410 is almost all vertical and linear so the basket 220 moves within vessel 100 without contact of sides of vessel 100. Conversely, the term "substantially linear movement" means that movement is almost all linear.

Hole 203 and shaft 200, 200B are close in diameter that an essentially liquid-tight junction is formed by their engagement. If desired, a seal (not illustrated for facilitating understanding) a tight sealed against liquid ingress into chamber 210. This configuration, with or without a seal, permits vertical and essentially linear motion of shaft 200, 200B at hole 203.

With additional reference to FIGS. 1, 3, 7 and 8, basket 220 is coupled to a lower portion of shaft 200, 200B. Basket 220 may be made of any temperature resistant material. Basket 220 vertically and essentially linearly with shaft 200, 200B, as noted. Shaft 200, 200B is fixed to a top 225 of basket 220 at rigid connection 224. Basket 220 includes cavity 222 that can hold coffee, or another solid ingredient, such as, but not limited to, coffee beans, coffee bags, filter packs of coffee, coffee grounds, tea bags, tea leaves, flavorings, hot cocoa mixes, herbs, chicory, chai, matcha, and anything that can be brewed, now known or hereinafter conceived.

Basket 220 may include a multitude of ports, holes, orifices, or openings, referred to as openings 223. Basket 220 can be vertically and essentially linearly moved in direction (arrow X) by shaft 200, 200B at rigid connection 224. This vertical and essentially linear movement permits agitation of liquid within vessel 100. Movement of basket 220 permits liquid to transgress into and out of basket 220. Interaction of liquid into and out of basket 220 can create a turbulent and agitated flow and movement of liquid. The turbulent and agitated flow and movement of liquid can be within vessel 100 and also can be within basket 200. The turbulent and agitated flow and movement of liquid within basket 220 can permit enhanced liquid contact with solid ingredients within basket 220. The overall contact of liquid and solids/ingredient(s), for example, coffee, with the movement of liquid and solid ingredients, for example coffee, within basket 220 creates an infusion process during brewing where increased amounts of coffee oil is entrained in liquid.

Openings 223 allow liquid to enter and exit while limiting the exit of solid ingredients, if coffee or solids are disposed in basket 220. Openings 223 may be formed in any shapes, pattern, or configurations including round holes, polygonal holes, slots, ellipsoids, and spirals, combinations thereof, or any configuration or pattern now known or hereinafter designed. Moreover, openings 223 can be provided with irregularly shaped perimeters, which can increase turbulation and agitation of liquid, both in vessel 100 and in basket 220.

Basket 220 includes a cover 510 that encloses cavity 222. Cover 510 may be coupled to basket 220 by any coupling structure 520. Coupling structure 520 can include, but is not limited to, screw coupling, friction fit, bayonet coupling, fastening, clipping, snap on or other coupling structure, now known or hereinafter developed. Cover 510 may be perforated in a similar manner as cavity 222. Cover 510 may include at least one opening 223 or a series of openings 223. Cover 510 may be closable to retain ingredients within basket 220.

Figure 6:
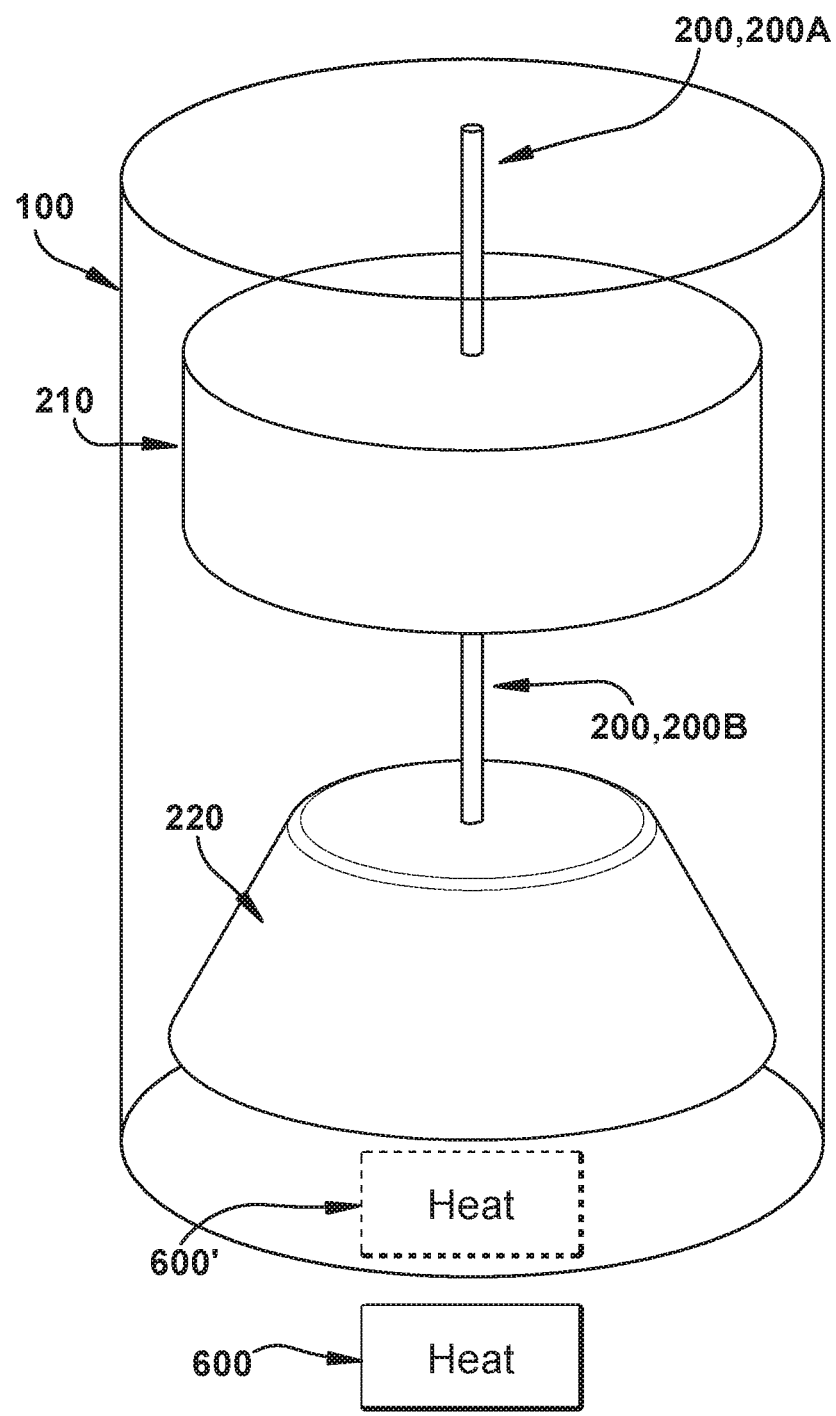
FIG. 6 illustrates a bottom perspective view basket, shaft, and chamber, in accordance with aspects of the disclosure.

FIG. 6 illustrates a bottom perspective view of basket 220 and cover 510. Cover 510 may be coupled to basket 220 via a pivot, joint, axis, hinge, swivel, or other suitable coupling mechanism, hereinafter hinge 530. Cover 510 opens at hinge 530 to permit access to cavity 222. Opening(s) 223 allows for liquid to flow into cavity 222 and contact any solid ingredients therein. Opening(s) 223 can be spaced on cover 510 to promote liquid flow into and out of basket 220. Size changes in opening(s) 223 can alter liquid flow into and out of basket 220 and alter liquid interaction with materials in cavity 222, which can increase turbulation and agitation of liquid, both in vessel 100 and in basket 220.

In operation, a liquid is added to vessel 100. A first solid ingredient (i.e., coffee) is added to cavity 222 within basket 220. Basket 220 is then positioned within vessel 100, with shaft 200, 200B being disposed within vessel 100. Chamber 210 flows thereafter and is positioned at top opening 110 of vessel 100. A user engages "on" or "start" switch 51 and electronics of control 50 are activated. An indicator light of the at least one indicator 53 will exhibit a first color that designates initiation of operations. Heat is applied to vessel 100, either from a heat supply 600, such as vessel 100 on a stove or vessel will contain an integral heating source. Control 50, which includes indicator lights 53, such as indicator lights for temperature, operational status, and the like. Control 50 also can automatically start motorized actuator assembly 120 when the predetermined temperature of liquid in vessel 100 is reached. When a temperature of the liquid in vessel 100 is about 165° F., indicator lights 53 change to alert the user that the liquid is reaching a temperature for optimum brewing. Further, when the sensed temperature reaches a temperature from about 180° F. to about 200° indicator lights 53 change once again to indicate to the user to reduce heat/temperature to vessel 100.

When the brewing of the beverage is complete, control 50 ceases operation of motorized actuator assembly 120. Thus, movement of basket 210 ceases and the brewed beverage is ready.

In certain aspects of the embodiments, control 50 can reduce heat or automatically turn heat supply 600 off. Moreover, aspects of the embodiments include audible signals in addition to temperature indicators 53 to provide the user with information on the overall process operational progression.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An apparatus for preparing a liquid, comprising:
    a vessel including a top opening, the vessel able to hold a liquid and defining at least one inner side wall;
    a shaft extending into the vessel;
    a basket coupled to the shaft, the basket having a cavity adapted to hold solid ingredients and defining at least one outer side wall; and
    a motorized actuator assembly; the shaft coupled to the motorized actuator assembly;
    wherein the at least one outer side wall of the basket is spaced from the at least one inner side of the vessel; and
    wherein the motorized actuator assembly vertically moves the shaft to move the basket alternately in a generally up and down fashion at times the apparatus is preparing the liquid.

2. The apparatus of claim 1, wherein the basket includes a wall, the wall including openings to allow liquid to enter and exit while limiting exit of solid ingredients disposed in the basket.

3. The apparatus of claim 2, wherein the openings are formed in a shape, pattern, or configuration including, but not limited to, round holes, polygonal holes, slots, ellipsoids, spirals, and combinations thereof.

4. The apparatus of claim 1, further including: a chamber, the motorized actuator assembly disposed in the chamber.

5. The apparatus of claim 4, wherein the chamber is disposed at the top opening of the vessel.

6. The apparatus of claim 4, wherein the shaft includes a first shaft and a second shaft, the first shaft disposed entirely within the chamber,
    a universal joint disposed on the first shaft, the universal joint disposed entirely in the chamber, the universal joint connecting the first shaft to the second shaft to allow the first shaft to transfer movement to second shaft to move the second shaft in a substantially vertical movement in the vessel,
    wherein the second shaft extends out of the chamber and the substantially vertical movement of the second shaft is substantially linear and vertical movement, the substantially linear and vertical movement moves the basket in the vessel.

7. The apparatus of claim 4, wherein the chamber is liquid tight to prevent liquid from entering the chamber.

8. The apparatus of claim 6, wherein the motorized actuator assembly imparts rotational and vertical movement to the first shaft, and wherein the universal joint transfers the rotational and vertical movement of the first shaft to the substantially linear and vertical movement of the second shaft.

9. The apparatus of claim 4, the apparatus further including a control, the control includes an automatic temperature sensing and control module to control the motorized actuator assembly.

10. The apparatus of claim 9, wherein the automatic temperature sensing and control module of the control will sense a first temperature of liquid in vessel for start and a second temperature of liquid in vessel to stop of power to the motorized actuator assembly.

11. The apparatus of claim 9, wherein the control includes at least one temperature indicator that indicates various temperature levels of liquid in the vessel.

12. The apparatus of claim 1, wherein the motorized actuator assembly includes at least one of an alternating-current (AC) electric power supply or a battery driven motor, where in the battery driven motor can include at least one of a rechargeable battery drive or a replaceable battery drive.

13. The apparatus of claim 1, wherein: the basket includes a cover permeable to liquids, the cover moveable from a closed position to an open position permitting access to the cavity wherein the solid ingredients within the basket are retained therein when the cover is in a closed position.

14. The apparatus of claim 1, wherein the solid ingredients include coffee, the coffee including at least one of: coffee beans, ground coffee, filter packs of coffee, or combinations thereof.

15. The apparatus of claim 1, further including: a heat source for heating the liquid.

16. An apparatus for preparing a liquid, including:
a vessel including a top opening;
a chamber, the chamber being liquid tight; a universal joint;
a first shaft and a second shaft;
a basket coupled to the second shaft; the basket adapted to hold solid ingredients; and
a motorized actuator assembly, the motorized actuator assembly, the universal joint, the first shaft disposed entirely in the chamber;
wherein the first shaft is coupled to the motorized actuator assembly in the chamber; and
the first shaft is coupled by the universal joint to the second shaft, the second shaft extending from the chamber out of the chamber and into the vessel,
wherein the universal joint allows the second shaft substantially linear and vertical movement of the basket in the vessel.

17. The apparatus of claim 16, wherein: the basket has at least one cavity, wherein the at least one cavity is permeable to liquid, and wherein the basket is configured to contain the solid ingredients, the basket including at least one opening to allow liquid to enter and exit, the at least one opening limiting exit of solid ingredients disposed in the basket.

18. The apparatus of claim 16, the apparatus further including a control, the control includes an automatic temperature sensing and control module to control the motorized actuator assembly wherein the automatic temperature sensing and control module of the control will sense a first temperature of liquid in vessel for start and a second temperature of liquid in vessel to stop power to the motorized actuator assembly.

19. The apparatus of claim 16, further including: a heat source for heating the liquid.

20. The apparatus of claim 6, wherein the chamber includes a bottom surface, the bottom surface of the chamber includes at least one opening in the bottom surface, the at least one opening in the bottom surface and the second shaft are close in diameter so that a liquid tight junction is formed by engagement of the at least one opening in the bottom surface and the second shaft.

* * * * *